US006226376B1

(12) United States Patent
Horan

(10) Patent No.: US 6,226,376 B1
(45) Date of Patent: May 1, 2001

(54) METHOD AND APPARATUS FOR REUSING SERVICE CIRCUIT RESOURCES IN A TELECOMMUNICATIONS NETWORK

(75) Inventor: C. Richard Horan, Bridgewater, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 08/915,363

(22) Filed: Aug. 20, 1997

(51) Int. Cl.[7] .............................. H04M 3/00; H04M 7/00
(52) U.S. Cl. .............................. 379/242; 379/9; 379/221; 379/279
(58) Field of Search ..................... 379/202, 203, 379/204, 221, 242, 243, 265, 266, 284, 2, 1, 9, 279; 370/216, 217, 218, 219, 220

(56) References Cited

U.S. PATENT DOCUMENTS

| 5,056,086 | 10/1991 | Libonati ................................. 370/62 |
| 5,065,392 | 11/1991 | Sibbitt et al. ........................... 370/58 |
| 5,193,110 | 3/1993 | Jones et al. ............................ 379/94 |
| 5,381,471 | 1/1995 | Balakrishman et al. ............. 379/269 |
| 5,440,563 | 8/1995 | Isidoro et al. ...................... 370/110.1 |
| 5,483,588 | * 1/1996 | Eaton et al. ......................... 379/202 |
| 5,581,600 | 12/1996 | Watts et al. ............................ 379/67 |
| 5,592,543 | * 1/1997 | Smith et al. .......................... 379/265 |
| 5,596,502 | 1/1997 | Koski et al. ..................... 364/468.01 |
| 5,757,781 | 5/1998 | Gilman et al. ........................ 370/260 |
| 5,812,652 | * 9/1998 | Jodoin et al. ......................... 379/205 |
| 5,812,653 | * 9/1998 | Jodoin et al. ......................... 379/205 |
| 5,864,617 | * 1/1999 | Donnelly .............................. 379/266 |
| 5,978,463 | * 11/1999 | Jurkevics et al. .................... 379/202 |

* cited by examiner

Primary Examiner—Harry S. Hong

(57) ABSTRACT

A method and apparatus for managing resources within a switch where the switch has multiple service circuits each being connected to its own subset of resources. A target service circuit having an available target resource is identified using a resource group list and a request for a resource having a first resource type. The request is based on a received call. The available target resource is connected to the call through the target service circuit. When the target resource is not needed during the call, the target resource is released from the call.

19 Claims, 7 Drawing Sheets

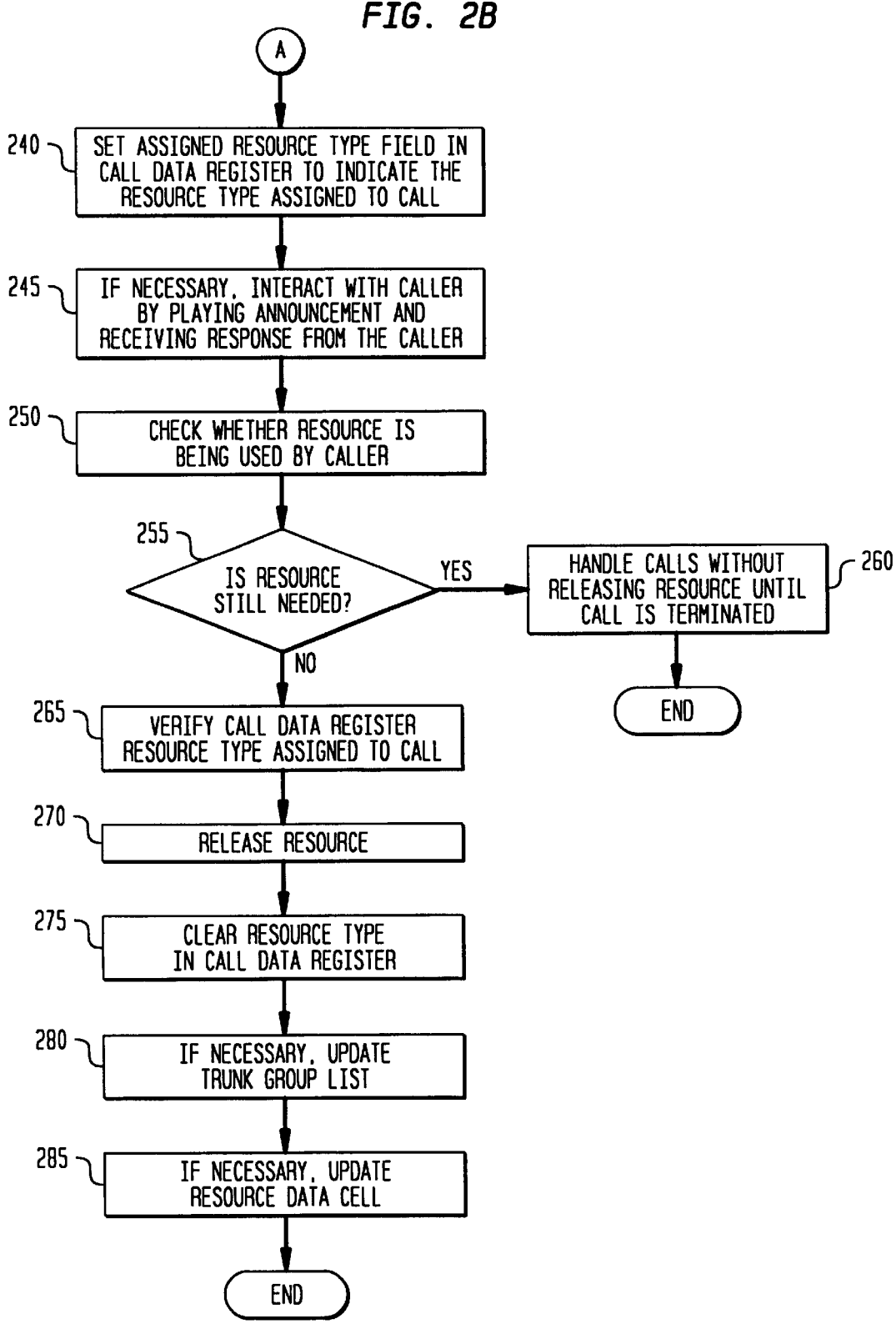

FIG. 3 RESOURCE DATA CELL 300

| RESOURCE TYPE | AVAILABILITY |
|---|---|
| 1 | Y |
| 2 | Y |
| 3 | N |
| 4 | Y |

FIG. 4 RESOURCE TRUNK GROUP LIST 400

| RESOURCE TYPE | RESOURCE TRUNK ID | AVAILABILITY |
|---|---|---|
| 1 | RESOURCE TRUNK 1 | Y |
| 1 | RESOURCE TRUNK 3 | N |
| 1 | RESOURCE TRUNK 4 | N |
| 1 | RESOURCE TRUNK 5 | Y |
| 1 | RESOURCE TRUNK 6 | Y |
| 2 | RESOURCE TRUNK 1 | Y |
| 2 | RESOURCE TRUNK 2 | Y |

FIG. 5 CALL DATA REGISTER 500

| CALL | SERVICE CIRCUIT ID | ASSIGNED RESOURCE TYPE |
|---|---|---|
| 10 | SERVICE CIRCUIT 3 | 1 |
| 21 | SERVICE CIRCUIT 5 | 1 |
| 32 | SERVICE CIRCUIT 3 | 2 |

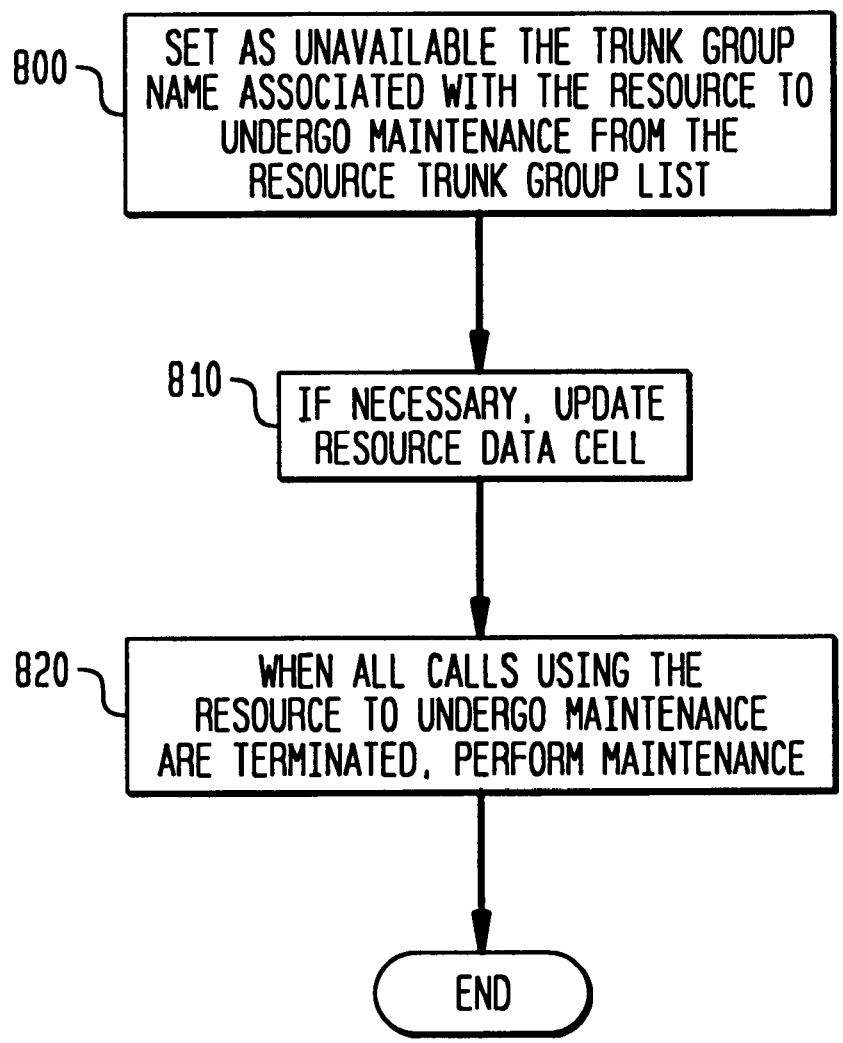

METHOD AND APPARATUS FOR REUSING SERVICE CIRCUIT RESOURCES IN A TELECOMMUNICATIONS NETWORK

FIELD OF THE INVENTION

The present invention relates to the reuse of service circuit resources in a telecommunications network.

BACKGROUND

Known switch systems with a telecommunications network typically have many service circuits each one of which is connected to many types of service circuit resources. Service circuits perform the basic functions that are required for every call. Service circuit resources are specialized circuits (e.g., speech detection circuitry and video conference bridges) that perform functions not required for every call.

For example, U.S. Pat. No. 5,440,563 by Isidoro et al., issued on Aug. 8, 1995 and assigned on its face to AT&T Corp., is an example of a known switch system. The switch allocates a pool of service circuits among many switches in a telecommunications network. A regional control node external from the switches controls the connection of the service circuits to the switches. The individual service circuit resources are collectively allocated with the service circuit itself.

These known switch systems, however, suffer several shortcomings. First, requiring more service circuit resources than is required can be quite expensive. Although a subscriber may choose to have a particular resource available for calls, not all calls require that resource to be connected for the entire duration of the call. Even when the call processing and/or service logic of the switch turn off a resource, the resource remains assigned to the call and cannot be reassigned to any different calls.

For example, although a subscriber may choose to have speech detection capabilities available to callers, when a caller opts to interact with the switch through dual tone multi-frequency (DTMF) signal rather than through speech, the speech detection resource is no longer required to be connected to the call. In such a case, the resource is tied up unused until that call is terminated. Even if the speech detection resource is turned off by call processing and/or service logic, the speech detection resource is unavailable to be used by other calls. This reduces the efficiency of utilization of these resources and thereby increases the costs associated with the switch and, consequently, with the call.

Second, when a particular resource fails, known switches cannot distinguish this failed resource from functioning resources connected to the same service circuit. Consequently, more resources are removed from service for repair and/or diagnosis than is necessary.

SUMMARY

The present invention can release a service circuit resource before a call is terminated when the service circuit resource is no longer needed for that call. The released resource can then be reused with another call.

The present invention can remove from service one service circuit resource connected to a service circuit without removing all the other service circuit resources connected to that service circuit and without removing that service circuit. Consequently, maintenance can be performed to the removed service circuit resource without affecting all the other resources connected to the service circuit.

A method and apparatus for managing resources within a switch where the switch has multiple service circuits each being connected to its own subset of resources. A target service circuit having an available target resource is identified using a resource group list and a request for a resource having a first resource type. The request is based on a received call. The available target resource is connected to the call through the target service circuit. When the target resource is not needed during the call, the target resource is released from the call.

BRIEF DESCRIPTION OF THE DRAWINGS

FIGS. 2A and 2B are a flowchart showing the process for reusing service circuit resources associated with an incoming call, according to an embodiment of the present invention.

FIG. 3 illustrates a configuration for the resource data cell, according to an embodiment of the present invention.

FIG. 4 illustrates an example configuration for the resource trunk group list, according to an embodiment of the present invention.

FIG. 5 illustrates a call data register, according to an embodiment of the present invention.

FIG. 8 is a flowchart showing the process for preparing a resource for maintenance, according to an embodiment of the present invention.

DETAILED DESCRIPTION

Figure 1:
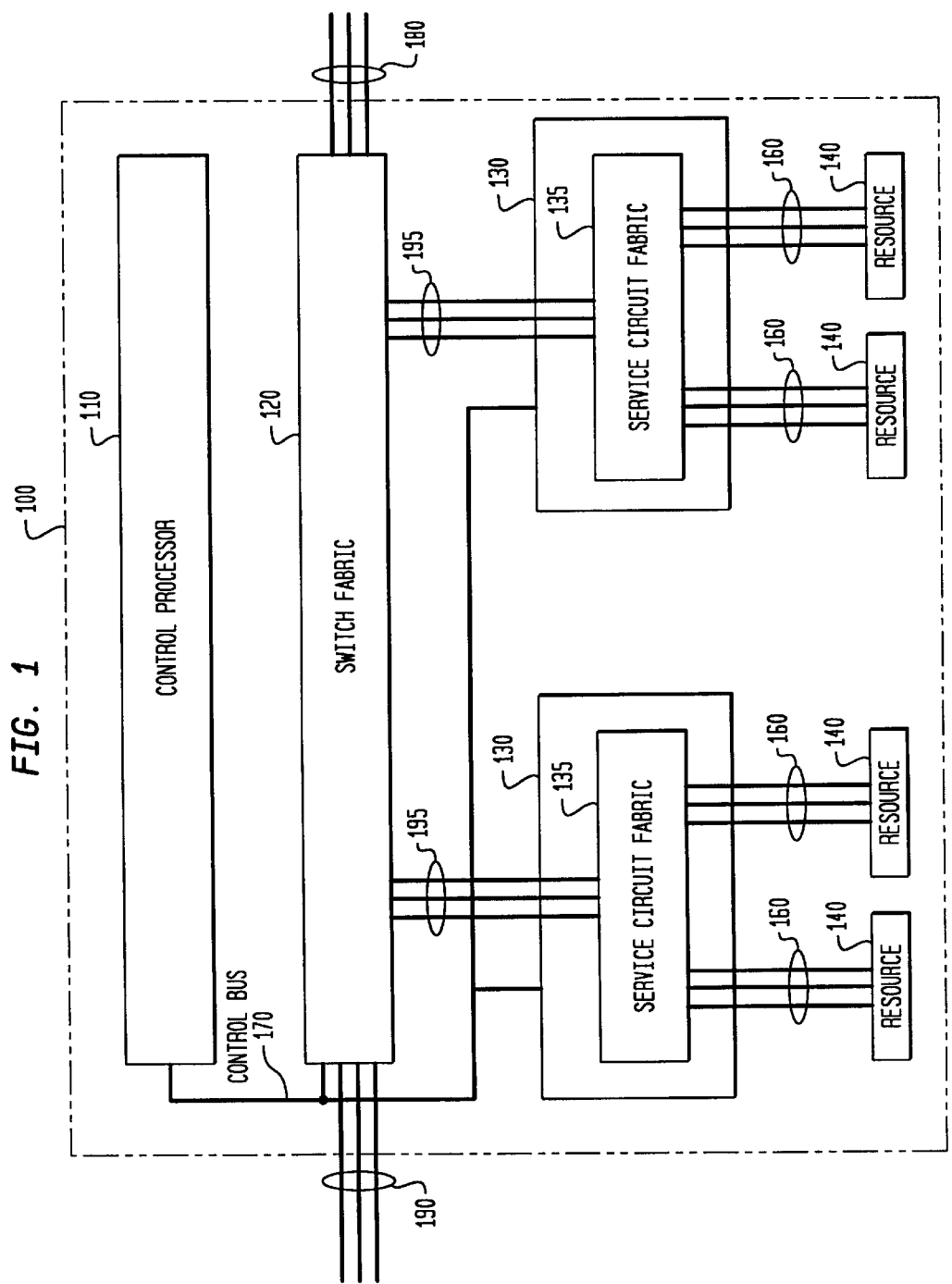
FIG. 1 illustrates a switch for use with a telecommunications network, according to an embodiment of the present invention.

FIG. 1 illustrates a switch for use with a telecommunications network, according to an embodiment of the present invention. Switch 100 comprises control processor 110, switch fabric 120, service circuits 130 and resource groups 140. Control bus 170 connects control processor 110, switch fabric 120 and service circuits 130. Switch 120 is connected to service circuits 130 by service circuit trunks 195. Switch fabric 120 receives incoming signals from incoming trunks 180 and sends outgoing signals to outgoing trunks 190.

Each service circuit 130 includes a service circuit fabric 135. Resource groups 140 are connected to service circuit 130 by service circuit fabric 135 through resource trunks 160.

Control processor 110 performs call processing and service logic for switch 100. Control processor can include computer-readable memory (not shown) which can store information. Control processor 110 can be any type of switch processor such as the Lucent Technologies 4ESS® switch processor 1B.

Switch fabric 120 can be any type of switching technology which switches incoming trunks 180 and outgoing trunks 190 to service circuit trunks 195. Switch fabric 120 can be any type of switch technology such as a fabric of conventional mechanical, electrooptic, thermo-optic, acousto-optic, liquid crystal, semiconductor optical amplifier, and/or micro-electronic mechanical switches.

Service circuits 130 can be any type of service circuits as are known, such as the Lucent Service Circuit Systems.

Service circuits perform the basic functions that are required for every call. For example, service circuits 130 can comprise the circuitry associated with receiving and decoding dual-tone multi-frequency (DTMF) tones.

Service circuits 130 are connected to the respective switch fabric 120 by service circuit trunks 195. Service circuit trunks 195 can comprise any type of transmission lines appropriate to transmit signals between switch fabric 120 and service circuits 130. For example, service circuit trunks can comprise coaxial cables, optical fibers or twisted pair wires.

Resource groups 140 can comprise multiple service circuit resources (also referred to herein as "resources") which are any type of specialized circuitry for functionality not required for every call. Resource groups, for example, can include those packaged by Lucent Technologies in a Custom Data Services Unit (CDSU). A resource can comprise specialized circuitry that performs automated speech recognition (ASR), video conference bridge, etc. Typically, a given service circuit 130 will be connected to multiple resource groups 140 that offer different types of resources, i.e., different types of specialized circuitry.

Resource groups 140 are connected to the respective service circuits 130 by resource trunks 160. Resource trunks 160 can comprise any type of transmission lines appropriate to transmit signals between resources 140 and service circuits 130. For example, resource trunks can comprise coaxial cables, optical fibers or twisted pair wires.

Incoming trunks 180 and outgoing trunks 190 comprise any type of transmission lines that connect switch 100 with other devices within the telecommunications network, such as other switches. For example, incoming trunks 180 and outgoing trunks 190 can comprise fiber optic cables suitable for long-distance communications.

Although FIG. 1 shows two service circuits 130 each being connected to two resources 140 for purposes of clarity, any number of service circuits 130 can be connected to switch fabric 120 of switch 100. Similarly, any of the service circuits can be connected to any number of resources 140.

Figure 2A:
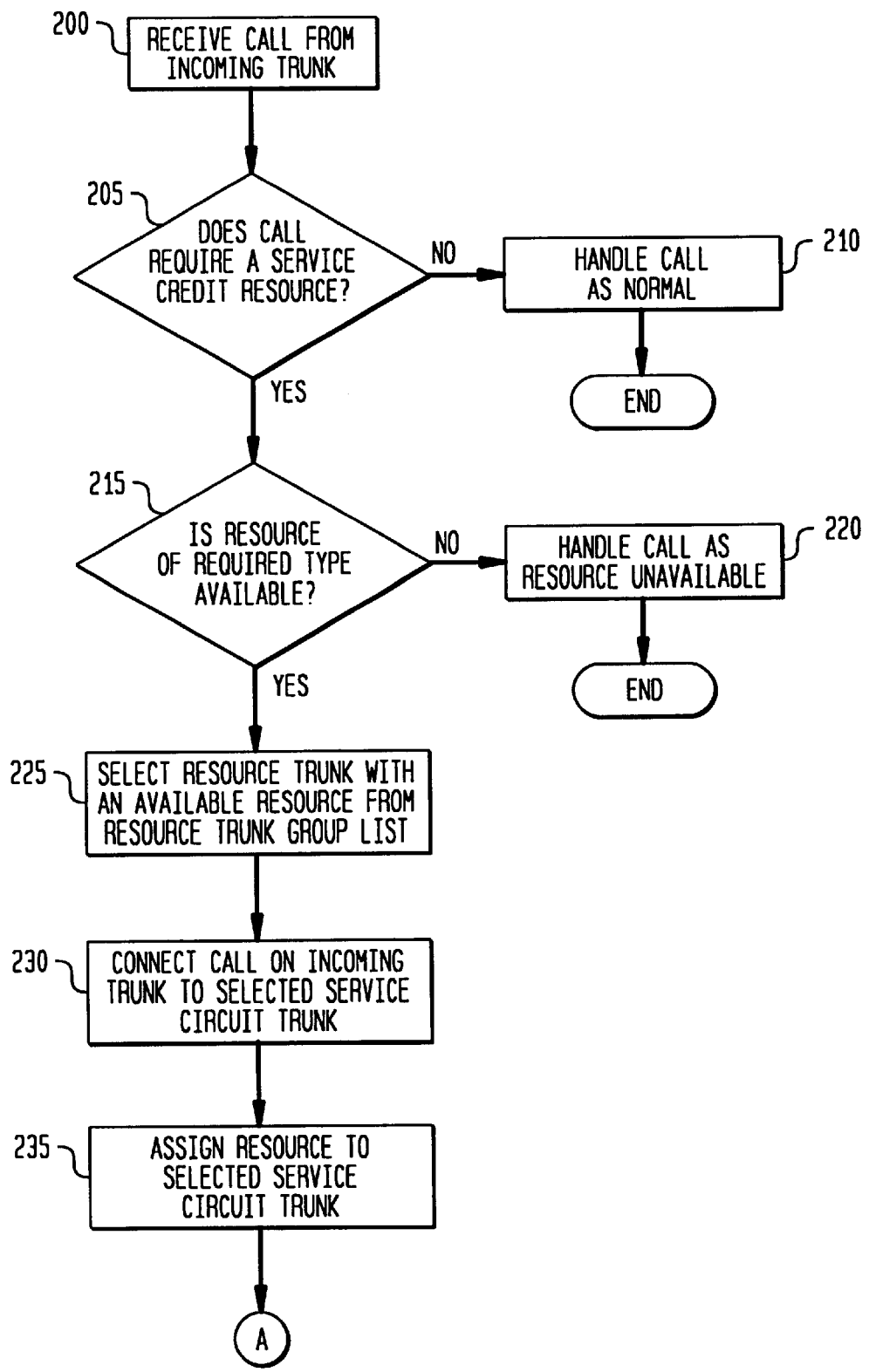

FIGS. 2A and 2B comprise a flowchart showing the process for reusing service circuit resources associated with an incoming call, according to an embodiment of the present invention. The process begins at step 200 where switch 100 receives a call on one of the lines in incoming trunks 180.

At step 205, control processor 110 determines whether the call requires a service circuit resource. Call processing and/or service logic software and/or hardware within control processor 110 determines whether the call requires a service circuit and a service circuit resource. In determining whether a service circuit resource is required, control processor 110 also identifies the type of resource required. In other words, control processor identifies whether the call requires the specialized circuitry associated with ASR, video conference bridge, etc.

If the call received at switch 100 does not require a service circuit resource, then the process proceeds to step 210. At step 210, the call is handled by switch 100 as a normal call and the process ends. If the call requires a service circuit resource then the process proceeds to conditional step 215.

At conditional step 215, control processor 110 determines whether a resource of the required resource type is available by checking a resource data cell stored with the computer-readable memory of control processor 110. FIG. 3 illustrates a configuration for the resource data cell, according to an embodiment of the present invention. Resource data cell 300 can have two fields: resource type field 310 and availability field 320. In the example shown in FIG. 3, resources of resource types 1, 2, and 4 are available, but resources of resource type 3 are not available.

If a resource of the required type is not available, then the process proceeds to step 220. At step 220, the call is handled as a call not having that resource available, then the process ends. For example, in the case where the required resource is ASR and ASR is unavailable, then control processor 110 can have the call routed to a live operator.

If a resource of the required type is available for the resource type required, then the process proceeds to step 225. At step 225, control processor 110 selects a resource trunk 160 with an available resource from the resource trunk group list. Control processor 110 can select, for example, the first resource trunk 160 within the resource trunk group list that is available.

FIG. 4 illustrates an example configuration for the resource trunk group list, according to an embodiment of the present invention. As illustrated in FIG. 4, resource trunk group list 400 can include three fields: resource type field 410, resource trunk identification field 420 and availability field 430. Resource trunk group list 400 indicates, for each resource type, the availability of the resource trunks 160 that connect a resource of the desired resource type from resource groups 140 to service circuits 130.

At step 230, the call on incoming trunk 180 is connected through switch fabric 120 to the service circuit trunk 195 corresponding to the resource trunk 160 selected in step 225. In other words, the resource trunk 160 selected in step 225 corresponds to a particular service circuit 130 which is connected to a particular service circuit trunk 195; switch fabric 120 connects the call to that particular service circuit trunk 195 thereby routing the call to the proper service circuit 130.

At step 235, the service circuit 130 corresponding to the resource trunk 160 selected in step 235 assigns a resource from a resource group 140. In other words, the service circuit 130 connects the call through an available transmission line in resource trunk 160 to an available resource from a resource group 140.

At step 240, the assigned resource type field in the call data register is set to indicate the resource type assigned to the call. FIG. 5 illustrates a call data register, according to an embodiment of the present invention. As shown in FIG. 5, call data register 500 can include the following fields: call field 510 containing the call identification and general call information, service circuit ID field 520 indicating to which service circuit 130 the call is connected, and assigned resource type field 530 indicating which type of resource is assigned to the call.

For example, assigned resource type field 530 can include numeric values indicating the resource type assigned. For example, if the assigned resource type is ASR, then resource type assigned field 530 can have a value of 1. If the assigned resource type is a video conference bridge, then resource type assigned field 530 can have a value of 2. If no resource is assigned, then assigned resource type field 530 can have a value of 0.

At step 245, if necessary, switch 100 can interact with the caller by playing announcements and receiving responses from the caller. Returning to the example of ASR, switch 100 can play the caller an announcement of "either press one or speak one now". The caller can respond by either pressing one on the telephone thereby sending a DTMF value of one or by speaking "one."

At step 250, switch 100 checks whether the resource is being used by the caller. Again, returning to the example of the ASR resource, if the caller responds with a DTMF value of one, rather than speaking "one," then switch 100 recognizes that the ASR resource is not needed for this particular call.

At conditional step 255, switch 100 determines whether the resource is needed. More specifically, control processor 110 determines that the resource is not needed if the resource is not being used by the caller. Returning to the example of the ASR resource, if the caller responds with DTMF rather than with voice, then the ASR resource is no longer necessary.

If the resource is still required, then the process proceeds to 260 where the call is handled without releasing the resource until the call is terminated. If the resource is no longer needed, then the resource can be released before the call is terminated and the process proceeds to step 265.

At step 265, control processor 110 verifies that the resource type assigned to the call as shown in call data register 500 is, in fact, the resource determined by control processor 110 that can be released. At step 270, control processor 110 releases the resource by sending an instruction to service circuit 130 through control bus 170. Service circuit 130 then releases resource.

At step 275, control processor 110 clears the resource type in call data register 500. In other words, if the assigned resource type field 530 in call data register 500 had a value other than 0 then the value of this field 530 is reset to 0 thereby indicating that no resource is assigned to the call.

At step 280, if necessary, control processor 110 updates the resource trunk group list 400. In other words, if all resources associated with resource group 140 connected through a particular resource trunk 160 was previously unavailable and the released resource is now the first available in this particular resource trunk 160, then the availability field 430 in resource trunk group list 400 corresponding to the resource type of the released resource is switched from a value of "N" to a value of "Y" thereby indicating that a resource of that type for that trunk group is available.

At step 285, if necessary control processor 110 updates resource data cell 300. In other words, if all the resource trunks 160 in the resource trunk group list were listed as previously unavailable until the released resource became available, then availability field 320 in resource data cell 300 is switched from "N" to "Y" thereby indicating that a resource of that type is available for switch 100.

For example, if a resource of type 3 was previously unavailable for switch 100, and a resource of type 3 was released, then the availability field in the resource data cell for resource type 3 would be switched from an "N" to a "Y." The process then ends.

Figure 6:
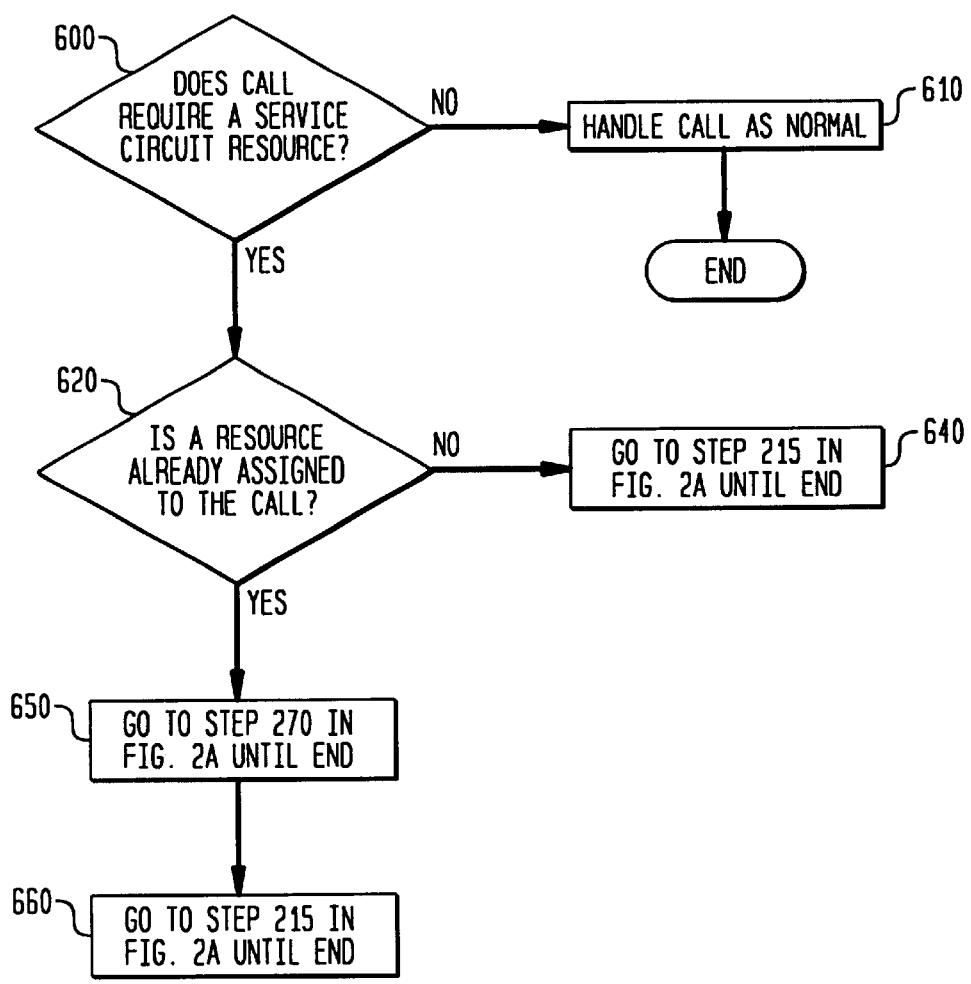
FIG. 6 is a flowchart showing the process for assigning a resource for a previously connected call, according to an embodiment of the present invention.

FIG. 6 is a flowchart showing the process for assigning a resource to a previously connected call, according to an embodiment of the present invention. This process is appropriate when the resource was previously released because the resource was not initially required but is required during a later portion of the call. For example, a subscriber programing a speed dialing setup can start entering DTMF values but then require an ASR resource later in the call to enter voice commands associated with the speed dialing.

At conditional step 600, control processor 110 determines whether the call requires a service circuit resource. Call processing and/or service logic software and/or hardware within control processor 110 determines whether the call requires a service circuit resource. In determining whether a service circuit resource is required, control processor 110 also identifies the type of resource required.

If the call does not require a service circuit resource, then the process proceeds to step 610. At step 610, the call is handled as a normal call and the process ends. If the call requires a service circuit resource, then the process proceeds to conditional step 630.

At conditional step 630, control processor 110 determines whether a resource is already assigned to the call. If a resource is not already assigned to the call, the process proceeds to step 640. At step 640, then a resource is assigned according to the process described above in FIGS. 2A and 2B. More specifically, the process goes to step 270 until the end, as shown in FIG. 2B.

If a resource is already assigned to the call, then the assigned resource must be of a type other than that now required by the call; the process then proceeds to step 650. At step 650, the assigned resource is released according to the process described above in FIGS. 2A and 2B. More specifically, the process goes to step 215 until the ends, as shown in FIGS. 2A and 2B.

Figure 7:
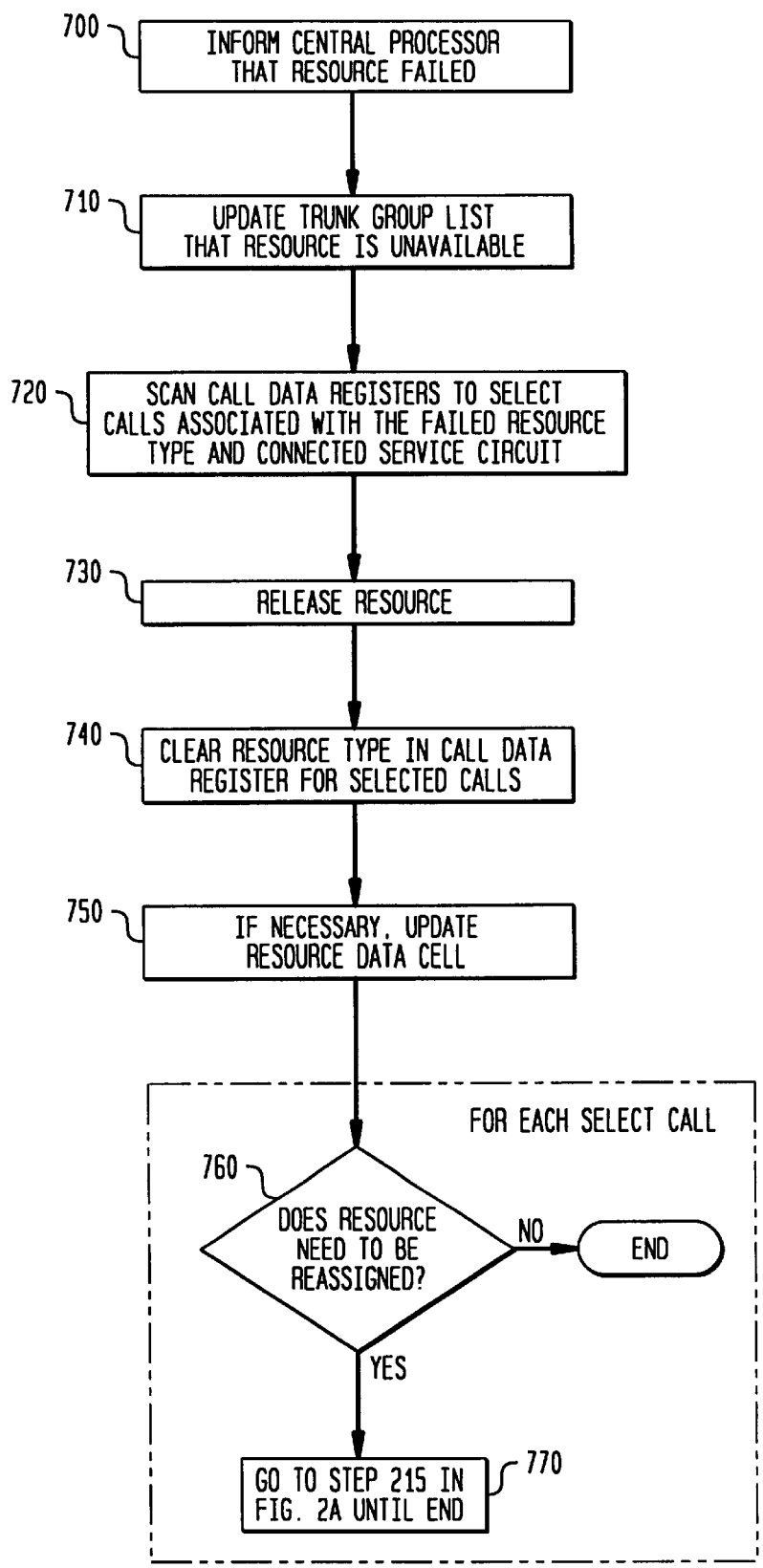
FIG. 7 is a flowchart showing the process for reassigning a resource when the previously connected resource fails, according to an embodiment of the present invention.

FIG. 7 is a flowchart showing the process for reassigning a resource when the previously connected resource fails, according to an embodiment of the present invention. At step 700, service circuit 130 connected to the failed resource informs control processor 110 through control bus 170 of the resource failure.

At step 710, a control processor 110 updates resource trunk group list 400 to provide availability field 430 with a value of "N" thereby indicating that resource is unavailable.

At step 720, control processor 110 scans call data registers 500 to select all of the calls associated with the failed resource type and with the service circuit connected to the failed resource. In other words, all call data registers 500 are identified having a value in service circuit ID field 520 matching the service circuit connected to the failed resource and having a value in assigned resource type field 530 matching the resource type of the failed resource.

At step 730, control processor 110 releases the failed resource by sending an instruction to the service circuit 130 connected to the failed resource; upon receiving the instruction, the service circuit 130 releases the failed resource.

At step 740, control processor 110 clears the resource type in the proper call data registers. In other words, for each call identified as being connected to the failed resource as indicated by call data register 500 scanned in step 720, the assigned resource type field is reset to "0" thereby indicating that the no resource is assigned to that call.

At step 750, if necessary, control processor 110 updates the resource data cell. In other words, if the resource data cell indicated that resources were previously available for the resource type associated with the failed resource and if the now failed resource was the only available resource, resource data cell 300 can be updated. Availability field 320 in resource data cell 300 can be changed to "N" thereby indicating that no resources are now available for the resource type of the failed resource.

At step 760, for each call selected in step 720, control processor 110 determines whether a resource needs to be reassigned to the call. If the call no longer needs a resource to be assigned, then the process ends. If the call needs a resource to be assigned, then a resource is assigned according to the process described above FIGS. 2A and 2B. More specifically, the process goes to step 215 until the end, as shown in FIGS. 2A and 2B.

FIG. 8 is a flowchart showing the process for preparing a resource for maintenance, according to an embodiment of the present invention. When a determination is made to perform maintenance on a resource, such as replacing hardware or operating specialized diagnosis software, then the process shown in FIG. 8 is performed.

At step 800, control processor 110 sets the resource trunk associated with the resource to undergo maintenance as unavailable within resource trunk group list 400. In other words, availability field 430 corresponding to the resource type and to the resource trunk ID for the resource to be maintained is changed within resource trunk group list 400 to a value of "N." Consequently, no additional calling are connected to the resource that is to be maintained.

At step 810, if necessary, control processor 110 updates resource data cell 300. In other words, if resource data cell 300 previously indicated that resources were available for the resource type associated with the failed resource and the resource to be maintained was the only available resource, availability field 320 in resource data cell 300 can be changed to "N" thereby indicating that no resources are now available for the resource type of the failed resource.

At step 820, when all calls using the resource to be maintained are terminated, maintenance can be performed on the resource. Because calls are not connected to the resource, no calls will be affected by removing the resource from operation and performing maintenance on the resource.

It should of course be understood that while the present invention has been described in reference to a particular system configuration and processes, other system configurations and processes should be apparent to those of ordinary skill in the art. For example, the present invention can include any number of service circuits and resources, and be connected to a communication network or combination of communication networks. Similarly, the resource data cell, the resource trunk group list and the call data register can be structured and/or arranged in any number of ways. For example, the resource data cell and the resource trunk group list can be combined into a single record without any hierarchial structure.

What is claimed is:

1. A method for managing a plurality of resources within a switch the switch having a plurality of service circuits each being connected to its own subset of resources from the plurality of resources, comprising:

(a) identifying a target service circuit from the plurality of service circuits having an available target resource from the plurality of resources using a resource group list and a request for a resource having a first resource type;

(b) connecting the available target resource to a call through the target service circuit; and (c) when it is determined that the target resource is not being used by a caller during the call, releasing the target resource from the call.

2. The method of claim 1, further comprising:

(d) updating, upon releasing the target resource, the resource group list to indicate the target resource being available if all other resources in the subset of resources connected to the target service circuit are unavailable.

3. The method of claim 1, further comprising:

(d) examining a resource data cell using the request for a resource having the first resource type to continue with step (a) when at least one resource of the first resource type is available from the plurality of resources.

4. The method of claim 1, further comprising:

(d) associating the call and the first resource type with a call data register containing status information about the call.

5. A method for changing a resource connected to a call during the call at a switch, the switch having a plurality of service circuits each being connected to its own subset of resources from the plurality of resources, a first resource having a first resource type being previously connected to the call, comprising:

(a) detecting a request for a second resource having a second resource type; and (b) when the second resource type does not match the first resource type stored in a call data register associated with the call, performing the following sub-steps during the call:

(i) identifying a target service circuit from the plurality of service circuits having an available target resource having the second resource type using a resource group list and the request for the second resource having the second resource type;

(ii) releasing the first resource from the call;

(iii) connecting the target resource to the call through the target service circuit; and (iv) updating the first resource type with the second resource type in the call data register associated with the call.

6. The method of claim 5, wherein step (b) further includes the following sub-step:

(v) updating, upon releasing the first resource, the resource group list to indicate the first resource being available if all other resources in the subset of resources connected to the target service circuit are unavailable.

7. The method of claim 5, wherein step (b)(i) is only performed when resource data cell indicates at least one resource of the second resource type is available from the plurality of resources, the resource data cell being examined using the request for the second resource type.

8. The method of claim 5, wherein each record in the resource group list corresponds to one service circuit within the plurality of service circuits.

9. The method of claim 5, further comprising:

(c) comparing the second resource type to the first resource type stored in the call data register.

10. A method for correcting a failed resource from a plurality of resources within a switch, the switch having a plurality of service circuits each being connected to its own subset of resources from the plurality-of resources, comprising:

(a) detecting the failed resource having a resource type from the plurality of resources;

(b) removing the failed resource from service;

(c) identifying an affected call connected to the failed resource; and (d) reassigning a second resource having the resource type to the call.

11. The method of claim 10, further comprising:

(e) examining a call data register to identify the call connected to the failed resource;

(f) updating the call data register for the call to indicate that the call is connected to the second resource.

12. The method of claim 10, further comprising:

(e) updating a resource group list to indicate that a service circuit to the failed resource is unavailable.

13. An apparatus for managing a plurality of resources, comprising:

a switch having:
a processor operating control software;
a plurality of resources connected to the processor;

a plurality of service circuits each being connected to its own subset of resources from the plurality of resources; and a memory device connected to the processor, the memory device storing a resource group list;

the processor identifying a target service circuit from the plurality of service circuits having an available target resource from the plurality of resources using a resource group list and a request for a resource having a first resource type;

the processor connecting the available target resource to a call through the target service circuit; and the processor, when it is determined that the target resource is not being used by a caller during the call, releasing the target resource from the call.

14. The apparatus of claim 13, wherein the identified target service circuit is the target resource.

15. The apparatus of claim 13, wherein the switch further includes:

an input port connecting the switch to a plurality of incoming trunks; and an output port connecting the switch to a plurality of outgoing trunks;

the call being-received on one incoming trunk from the plurality of incoming trunks, the request for a resource having a first resource type being based on the call; and the call being sent on one outgoing trunk from the plurality of outgoing trunks.

16. The apparatus of claim 13, wherein the processor updates, upon releasing the target resource, the resource group list to indicate the target resource being available if all other resources in the subset of resources connected to the target service circuit are unavailable.

17. The method of claim 13, wherein the processor identifies a target service circuit only when a resource data cell indicates at least one resource of the first resource type is available from the plurality of resources, the resource data cell being examined using the request for the first resource type.

18. The apparatus of claim 13, wherein the processor associates the call and the first resource type with a call data register containing status information about the call.

19. An apparatus for managing a plurality of resources, comprising:

means for identifying an available target resource from the plurality of resources using a resource group list and a request for a resource having a first resource type;

means for connecting a call to the available target resource using the resource group list;

means for releasing the target resource from the call when it is determined that the target resource is not being used by a caller during the call; and means for updating the resource group list to indicate the target resource being available when the target resource is released.

* * * * *